(12) United States Patent
Wray (10) Patent No.: US 7,877,220 B2
(45) Date of Patent: Jan. 25, 2011

(54) FLOWMETER

(75) Inventor: Troy Wray, Quedgley (GB)

(73) Assignee: ABB Limited, Gloucestershire (GB)

( * ) Notice: Subject to any disclaimer, the term of this patent is extended or adjusted under 35 U.S.C. 154(b) by 107 days.

(21) Appl. No.: 12/180,764

(22) Filed: Jul. 28, 2008

(65) Prior Publication Data

US 2009/0071264 A1 Mar. 19, 2009

(30) Foreign Application Priority Data

Jul. 26, 2007 (GB) .................................. 0714593.1

(51) Int. Cl.
G01F 1/00 (2006.01)
G01F 25/00 (2006.01)

(52) U.S. Cl. ..................................................... 702/100

(58) Field of Classification Search .................. 702/100
See application file for complete search history.

(56) References Cited

U.S. PATENT DOCUMENTS

| | | | |
|---|---|---|---|
| 4,272,760 A | 6/1981 | Prazak et al. | |
| 4,669,052 A | 5/1987 | Bianco | |
| 4,676,112 A | 6/1987 | Uematsu et al. | |
| 4,704,908 A | 11/1987 | Blatter | |
| 4,800,513 A | 1/1989 | Deutsch | |
| 4,912,660 A | 3/1990 | Kuipers et al. | |
| 5,381,148 A | 1/1995 | Mueck et al. | |
| 5,402,685 A | 4/1995 | Brobeil | |
| 5,503,027 A * | 4/1996 | Hemp | ...................... 73/861.12 |
| 5,544,532 A | 8/1996 | Brown | |
| 5,929,333 A | 7/1999 | Nair | |
| 6,118,811 A | 9/2000 | Narumi et al. | |
| 6,564,612 B2 | 5/2003 | Brockhaus | |
| 6,697,742 B1 * | 2/2004 | Franklin et al. | ................ 702/45 |
| 7,161,418 B2 | 1/2007 | Boos | |
| 7,265,544 B2 * | 9/2007 | Keese et al. | .................. 324/306 |
| 2003/0005778 A1 * | 1/2003 | Budmiger | ................. 73/861.17 |
| 2004/0260484 A1 * | 12/2004 | Wray | ........................... 702/45 |
| 2008/0127712 A1 * | 6/2008 | Baker | ......................... 73/1.16 |

FOREIGN PATENT DOCUMENTS

| | | |
|---|---|---|
| EP | 1489390 | 12/2004 |
| GB | 2309308 | 7/1997 |
| GB | 2332519 | 6/1999 |
| GB | 2332526 | 6/1999 |
| GB | 2348012 | 9/2000 |
| GB | 2400441 | 10/2004 |

* cited by examiner

Primary Examiner—Michael P Nghiem
Assistant Examiner—Cindy H Khuu
(74) Attorney, Agent, or Firm—Alston & Bird LLP (57) ABSTRACT

An electromagnetic flowmeter assembly is described in which an excitation field is set up across a flow conduit and electrodes are used to sense the electromagnetic field generated across the flow conduit as a result of interaction between the excitation field and fluid flowing along the flow conduit. The signals obtained from the electrodes are processed, together with stored calibration data, by processing circuitry to determine flow measurements and means is provided for dynamically updating the calibration data.

27 Claims, 4 Drawing Sheets

FLOWMETER

CROSS-REFERENCE TO RELATED APPLICATION

This application claims the benefit of British priority application GB 0714593.1, filed Jul. 26, 2007, which is expressly incorporated by reference herein in its entirety.

FIELD OF THE INVENTION

The present invention relates to a flowmeter and components thereof, particularly an electromagnetic flowmeter, with a self-calibration function.

BACKGROUND OF THE INVENTION

Previously, flowmeters have been supplied factory pre-calibrated i.e. the components of the flowmeter system, including excitation coils, amplification circuitry and control circuitry are calibrated at the time of manufacture, both individually and when assembled together to form the flowmeter system. The calibration of the amplification circuitry and control circuitry is typically performed at room temperature. However, the operating temperature of the flowmeter may differ markedly from room temperature, and therefore the flow measurements obtained will exhibit systematic errors due to miscalibration. Additional errors in the flow measurements are also introduced by the ageing of the components.

SUMMARY OF THE INVENTION

The present invention therefore aims to address this problem by providing a flowmeter having a self-calibration function which can re-calculate stored calibration data dynamically. Preferably, this recalibration is performed against a temperature-stable reference.

This significantly reduces the amount of factory calibration required for the amplification and control circuitry. This also allows the amplification and control circuitry to automatically compensate for changes in operating temperature without requiring a temperature sensor and empirical correction.

According to one aspect, the present invention provides a flowmeter assembly comprising: one or more excitation coils for generating an excitation field across a flow conduit; excitation circuitry for generating an excitation signal for application to the one or more excitation coils; one or more electrodes for sensing the electromagnetic field generated across the flow conduit as a result of interaction between the excitation field and fluid flowing along the flow conduit; processing circuitry for processing signals obtained from the one or more electrodes to determine one or more flow measurement values indicative of fluid flow through the conduit; wherein the processing circuitry comprises a calibration data store for storing calibration data and is operable to determine said one or more flow measurement values using said signals obtained from said one or more electrodes and said calibration data; and wherein the processing circuitry further comprises means for dynamically updating said calibration data.

In one embodiment, the processing circuitry combines the calibration data with the signals obtained from the one or more electrodes to correct for one or more characteristics (eg gain or DC offset) of the components of the processing circuitry.

In one embodiment, the processing circuitry comprises a calibration data history store for storing previously obtained calibration data from which it calculates current calibration data for use in determining the flow measurement values.

Preferably the calibration data for individual components of the processing circuitry is determined and updated on a regular basis, such as between flow measurements.

In one embodiment, the processing circuitry is operable to calibrate a first component of the processing circuitry against a reference source and to use the calibrated first component to calibrate one or more subsequent components of the processing circuitry. The reference source is preferably a temperature stable voltage reference source. Preferably the first component of the processing circuitry to be calibrated is an analogue-to-digital converter, ADC, which is calibrated by applying first and second voltage levels from the voltage reference source to the input of the ADC and by using the resulting first and second digitised counts from the ADC.

In one embodiment, the processing circuitry injects AC reference signals through different gain paths of the processing circuitry to determine gain calibration data for those gain paths. The gain paths can include one or more front-end amplifiers for amplifying signals obtained from the one or more electrodes or one or more programmable gain amplifiers for amplifying signals obtained from said one or more front-end amplifiers.

In one embodiment, the processing circuitry switches between a measurement mode, during which the processing circuitry performs flow measurements, and a calibration mode, during which the processing circuitry calibrates one or more of its components. Preferably, the processing circuitry adjusts the gain of said one or more programmable gain amplifiers to a lower gain during the calibration mode and to a higher gain during the measurement mode, to account for different signal levels passed through the gain stages in the two modes.

During the calibration mode, the processing circuitry preferably electrically isolates the one or more electrodes from the processing circuitry, to minimise interference.

According to another aspect, the present invention also provides: processing circuitry for use in a flowmeter, the processing circuitry comprising: means for receiving signals obtained from electrodes of the flowmeter; a calibration data store for storing calibration data for the flowmeter; and means for determining flow measurement values indicative of fluid flow through the flowmeter using the signals received from the electrodes and the calibration data from the calibration data store; wherein said processing circuitry further comprises means for dynamically updating the calibration data to take into account changing operating characteristics of the flowmeter.

The invention also provides a method of operating a flowmeter comprising: generating an excitation field across a flow conduit; generating an excitation signal for application to the one or more excitation coils; sensing the electromagnetic field generated across the flow conduit as a result of interaction between the excitation field and fluid flowing along the flow conduit; processing signals obtained from the one or more electrodes to determine one or more flow measurement values indicative of fluid flow through the conduit; wherein the processing step determines said one or more flow measurement values using said signals obtained from said one or more electrodes and stored calibration data; and wherein the method further comprises dynamically updating said calibration data.

BRIEF DESCRIPTION OF THE DRAWINGS

These and other aspects of the present invention will become apparent from the following exemplary embodiments that are described with reference to the following figures in which.

DETAILED DESCRIPTION

Overview

Figure 1:
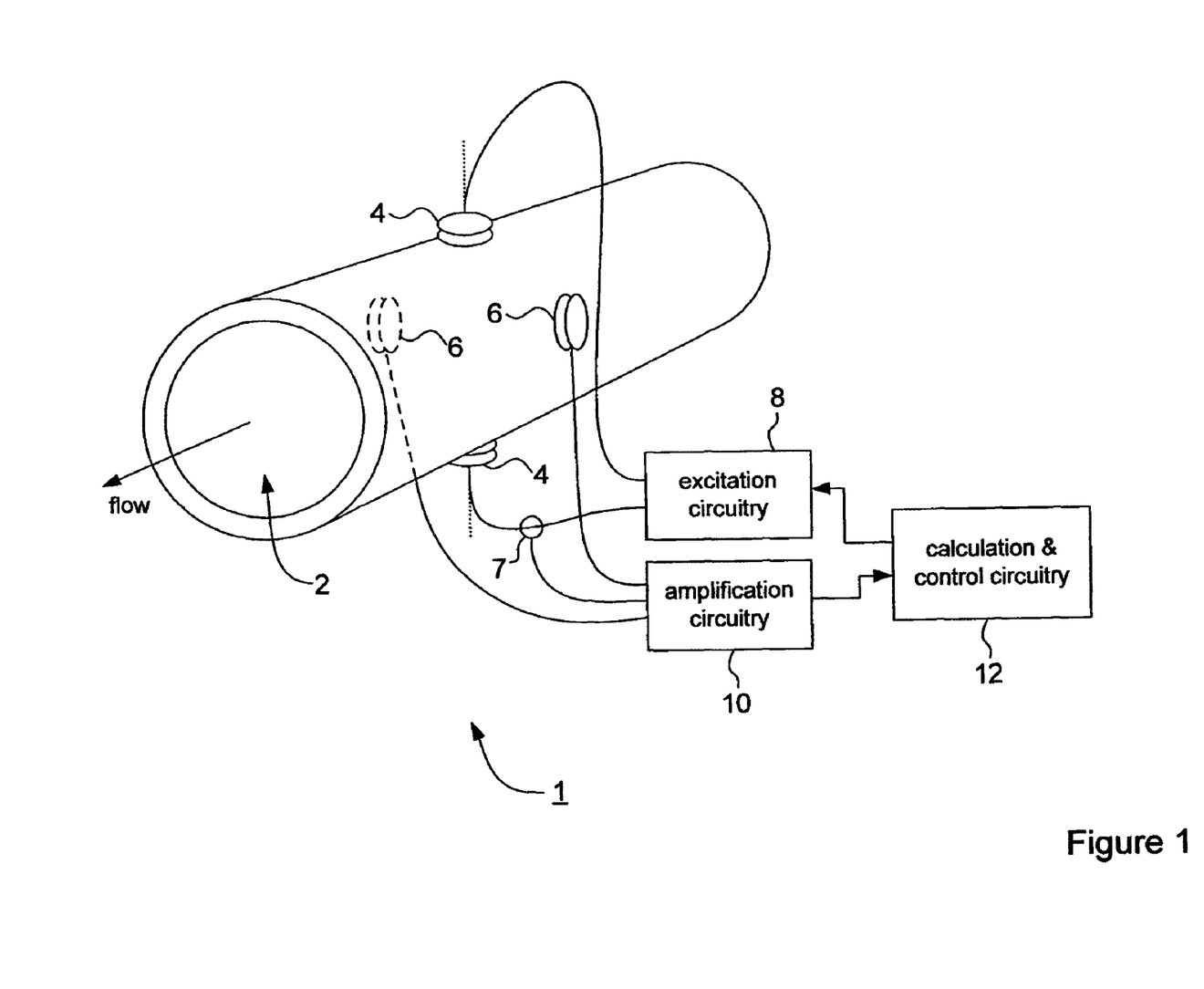
FIG. 1 is a schematic diagram of a flowmeter.

FIG. 1 shows a flowmeter 1 having a conduit 2 along which the fluid to be measured can flow; a pair of excitation coils 4 located at diametrically opposite points of the conduit 2 and perpendicular to the flow direction; and a pair of electrodes 6 located perpendicular to the flow direction, and also aligned perpendicular to the excitation coils 4. The excitation coils 4 are connected to excitation circuitry 8 and the electrodes 6 are connected to amplification circuitry 10. A current sensor 7 is also provided for sensing the current applied to the excitation coils 4 and its output is also connected to the amplification circuitry 10. Both the excitation circuitry 8 and the amplification circuitry 10 are connected to calculation and control circuitry 12, which controls the driving of the excitation circuitry 8 and processes the signals obtained from the amplification circuitry 10.

In operation, the calculation and control circuitry 12 sets the parameters of the drive signal (such as its amplitude and waveform shape) and then outputs the drive signal to the excitation circuitry 8, causing it to apply an excitation signal to the excitation coils 4. The excitation signal causes an electromagnetic field to be established between the excitation coils 4 across the conduit 2. The fluid flowing along the conduit 2 interacts with the excitation electromagnetic field to create an electric field across the conduit 2 perpendicular to the excitation field and the direction of fluid flow. This electric field causes a potential difference to be established between the electrodes 6 which varies with the rate at which the fluid flows along the conduit 2. The signals from the electrodes 6 are amplified by the amplification circuitry 10 and passed to the calculation and control circuitry 12. The amplification circuitry 10 also amplifies the signal obtained from the current sensor 7 and passes the amplified current signal to the calculation and control circuitry 12. The calculation and control circuitry 12 then processes the signals received from the amplification circuitry 10 (in a known manner) to determine desired flow measurements such as the flow velocity, the flow rate etc.

In this embodiment, the flowmeter has two modes of operation: a measurement mode and a calibration mode. Changing from one mode to the other is governed by the calculation and control circuitry 12 and involves the appropriate setting of one or more switches. In the measurement mode, the electrodes 6 and the current sensor 7 are connected to the amplification circuitry 10, as described above. However, in the calibration mode, the electrodes 6 and the current sensor 7 are isolated from the amplification circuitry 10, and calibration data for the flowmeter is determined by the calculation and control circuitry 12. As will be described in more detail below, this is done by generating calibrated reference signals which are injected through the various signal paths within the amplification circuitry 10 and within parts of the calculation and control circuitry 12, calculating data relating to the signal gain for each of the signal paths and storing the results as calibration data. The determined calibration data is then used, in a conventional manner, in the processing of the signals obtained during the measurement mode, to determine the desired flow measurements. More details of the calibration process will be described below.

Electronic Circuitry

Figure 2:
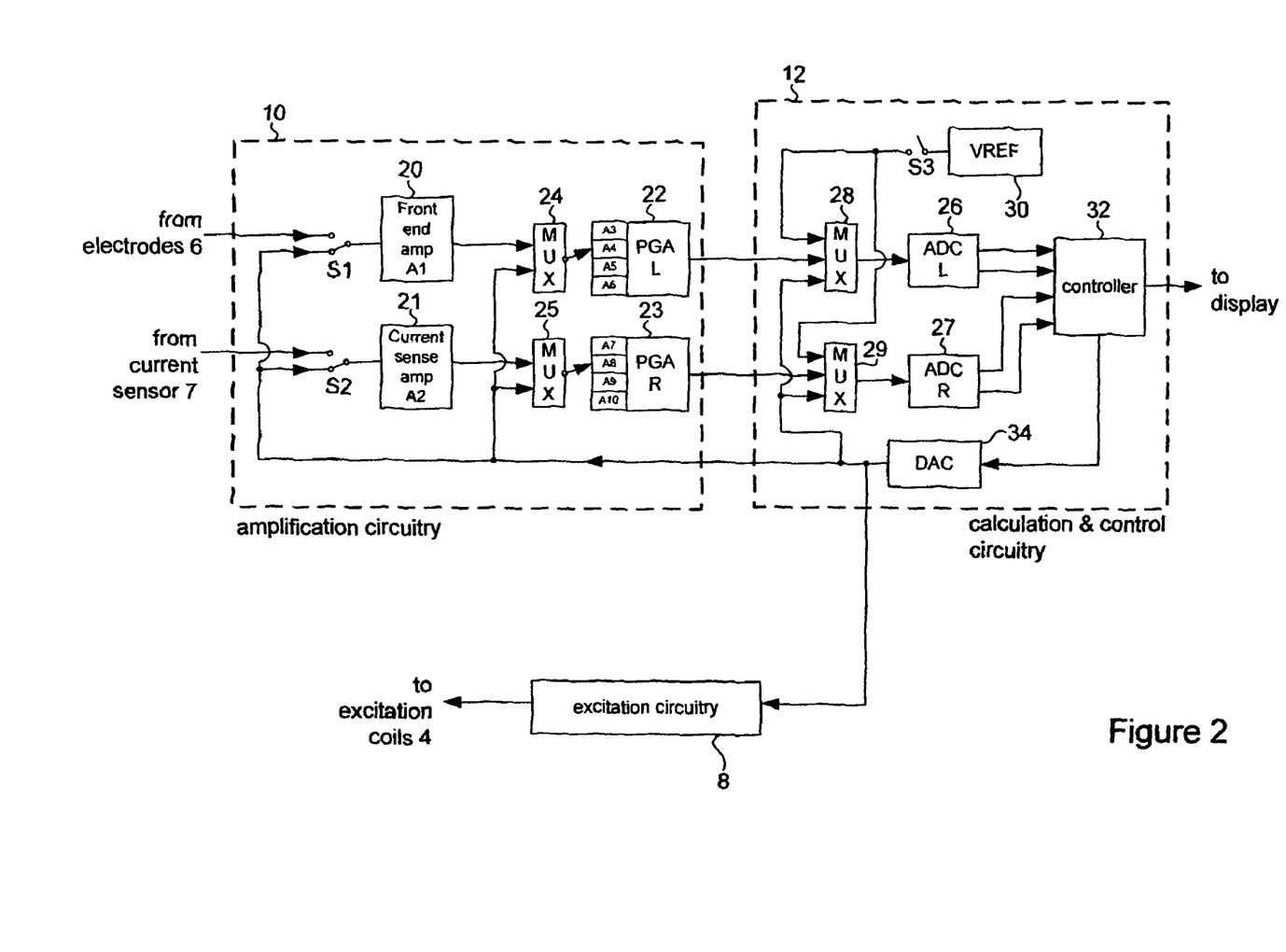
FIG. 2 is a schematic circuit diagram of the amplification circuitry and of the calculation and control circuitry of the flowmeter shown in FIG. 1.

FIG. 2 shows in more detail the main components of the amplification circuitry 10 and of the calculation and control circuitry 12 used in this embodiment. As shown, the amplification circuitry 10 comprises front end amplifier 20 (having gain A1, nominally 11) which receives and amplifies the signals from the electrodes 6; current sense amplifier 21 (having gain A2) which receives and amplifies the signals from the current sensor 7; and programmable gain amplifiers (PGA) PGA-L 22 with selectable gains A3 to A6 and PGA-R 23 with selectable gains A7 to A10. The gains of PGA-L 22 and PGA-R 23 are selected so as to amplify the respective input signals so that they make full use of the dynamic range of the subsequent circuitry. In this embodiment, PGA-L 22 and PGA-R 23 have nominal gains A3 to A6 and A7 to A10 of 1, 2.4, 8 and 24. As those skilled in the art will appreciate, the signal received from the electrodes 6 is likely to be much smaller than that from the current sensor 7, and that the gain A1 of the front end amplifier 20, the gain A2 of the current sense amplifier 21 and/or the gains A3 to A10 of the PGAs 22 and 23 will be selected accordingly. Typically, the signal from the electrodes 6 is of the order of microvolts ($\mu V$); and the signal from the current sensor 7 in millivolts (mV).

As shown in FIG. 2, the calculation and control circuitry 12 comprises analogue-to-digital converters (ADC) ADC-L 26 and ADC-R 27 for converting the received signals into digital form; a digital-to-analogue converter (DAC) 34 for converting digital signals to analogue form; a temperature-stable voltage reference source ($V_{REF}$) 30 used for calibration, having a small temperature coefficient $t_c$ such that its output voltage is largely independent of temperature; and a controller 32 which performs the required processing of the received digital signals and generates the digital signals applied to the DAC 34. The controller 32 is also operable to generate and output signals for displaying on a display unit (not shown).

As shown in FIG. 2, both the amplification circuitry 10 and the calculation and control circuitry 12 include several multiplexers (MUX) 24, 25, 28 and 29 and switches S1 and S2 for routing signals according to whether the flowmeter is in the calibration mode or the measurement mode. The multiplexers 24 and 28, PGA 22 and ADC 26, and the corresponding multiplexers 25 and 29, PGA 23 and ADC 27 define two separate measurement channels L and R to allow for measurement of two signals simultaneously, for example, in measurement mode, the signals from the electrodes 6 and current sensor 7; and in calibration mode, the input and output signals of a component or stage being calibrated. As will be described in more detail below, the controller 32 controls the operation of the multiplexers and the switches so that the desired flow measurements or calibration measurements are obtained.

Control Software

Figure 3:
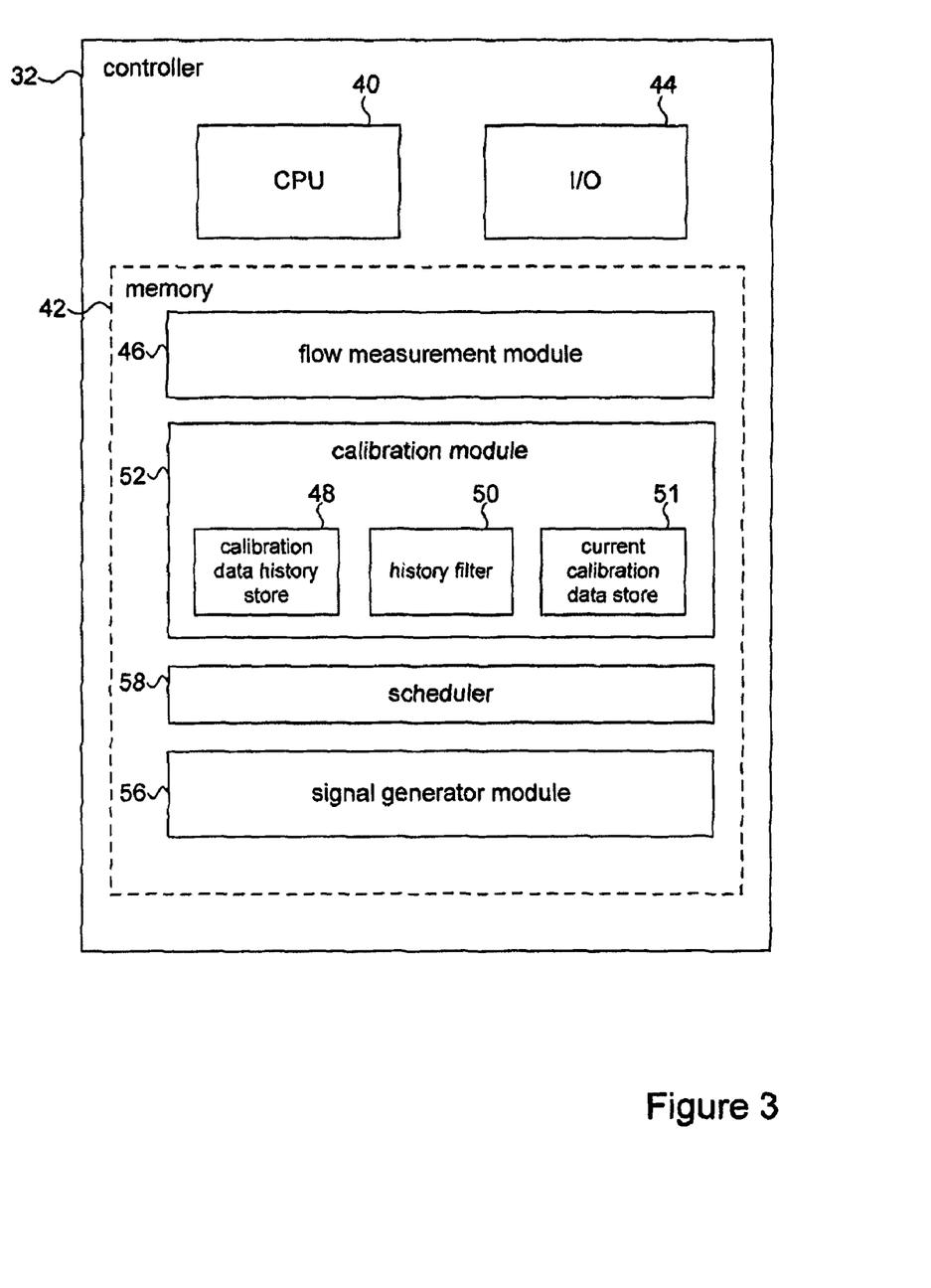
FIG. 3 is block diagram of the main components of the controller unit forming part of the calculation and control circuitry shown in FIG. 2.

FIG. 3 illustrates the main components of the controller 32 used in this embodiment. As shown, the controller 32 comprises a central processing unit (CPU) 40, memory 42 having a number of software modules used to define the operation of the CPU 40 during various tasks, and an input/output (I/O) unit 44 for accepting user data input and for outputting information to a user. As shown in FIG. 3, the software modules stored in memory 42 include a flow measurement module 46 for performing flow measurement tasks; a calibration module 52 for performing calibration tasks; a scheduler 58 for scheduling control between the calibration module 52 and the flow measurement module 46; and a signal generator module 56 for generating the required excitation and calibration reference signals required by the calibration module 52 and the flow measurement module 46.

Calibration Module

Figure 4:
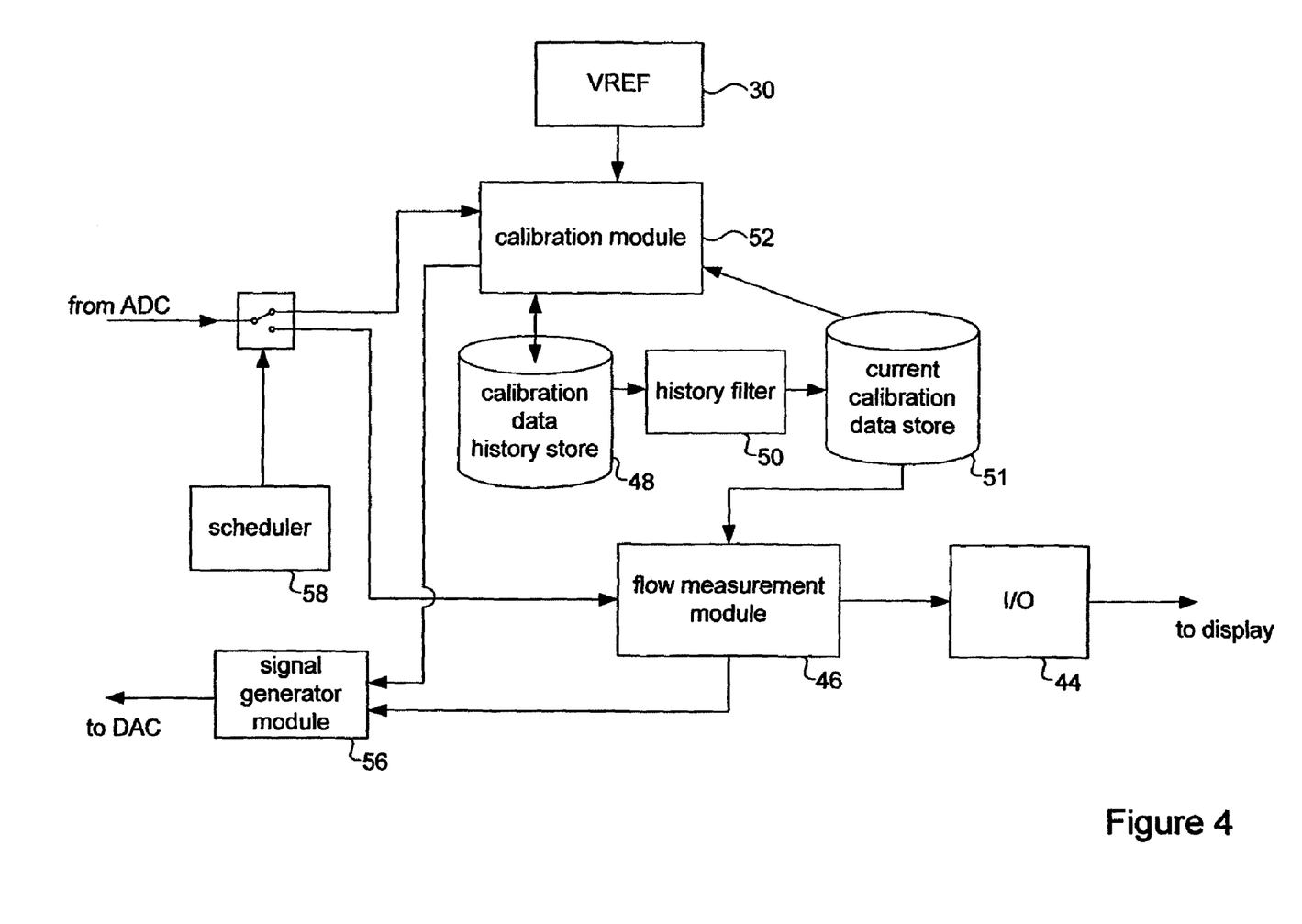
FIG. 4 illustrates the operation of the components of the controller shown in FIG. 3 according to whether the flowmeter is in a calibration mode or a measurement mode.

Referring generally to FIG. 4, when the scheduler 58 places the flowmeter 1 into the calibration mode, control of the flowmeter is passed to the calibration module 52, which sets the switches S1 and S2 (shown in FIG. 2) to isolate the electrodes 6 and the current sensor 7 respectively from the amplification circuitry 10. The calibration module 52 then proceeds to calibrate one or more components of the flowmeter. Initially, at start-up, a full calibration of the components is performed. Subsequently, the calibration module 52 can perform further full calibrations of the components (for example, when a flowmeter reset instruction is received from the user) or can select individual components for calibration either according to a set schedule or in response to identification of a possible problem with the component.

When calibrating a component of the flowmeter 1, the calibration module 52 determines calibration data relating to the gain (and for some components the zero offset) for the component which it stores for use in subsequent flow measurement and diagnostic calculations. In this embodiment, a history of such determined calibration data for each component is maintained by the calibration module 52 in the calibration data history store 48. The history filter 50 of the calibration module 52 calculates running averages of the calibration data values stored in the calibration data history store 48 over several—say twenty or thirty—consecutive calibrations and stores these averages in a current calibration data store 51 for the flowmeter 1. Thus the current calibration data store 51 will include average calibration data for each component of the flowmeter 1 for which calibration data is obtained, which values are used by the flow measurement module 46 in its flow calculations.

In this embodiment, the calibration module 52 identifies if any new calibration data values for a component are inconsistent with previous calibration data values for that component (for example, a predefined percentage higher or lower than the corresponding calibration data held in the current calibration data store 51) and flags them in the calibration data history store 48 so that they are excluded by the history filter 50 in its averaging to determine the current calibration data held in the current calibration data store 51. This is done to protect against individual calibration errors, say from spurious readings possibly due to a voltage spike in the circuitry. This can also provide a diagnostic function as it allows for tracking of component performance (which may also be used to monitor external conditions) and/or prediction of component failure. This can be done, for example, by keeping track of the number and/or frequency of inconsistent calibration readings obtained for a component and indicating possible failure when this number exceeds a predetermined value. Faults in components can therefore be detected as they occur—or, where a trend towards failure is determined, anticipated—traced to their source, and suitable action, such as replacement of the component, taken. The calibration module 52 then recalculates calibration data for the flowmeter 1, with the replaced component.

This is unlike the flowmeters of the prior art which require in-factory calibration of the entire flowmeter each time a component fails and is replaced.

When performing a full calibration of the flowmeter 1, the calibration module 52 calibrates the components as follows:

Calibration of the ADCs

The ADCs 26 and 27 are calibrated first against the stable voltage reference source 30. In particular, calibration module 52 sets switch S3 to apply zero volts and then the voltage reference signal $V_{REF}$ from the voltage reference source 30 via the multiplexers 28 and 29 to the ADCs 26 and 27. When zero volts is applied from the voltage reference source 30 through the multiplexers 28 and 29 to the ADCs 26 and 27, the count $N_0^{ADC}$ obtained from each ADC is passed to the calibration module 52; and when $V_{REF}$ volts is applied, the count $N_{VREF}^{ADC}$ obtained from each ADC is passed to the calibration module 52. The calibration module 52 stores these two counts $N_0^{ADC}$ and $N_{VREF}^{ADC}$ as calibration data for the ADCs 26 and 27.

Assuming the ADCs 26 and 27 have linear conversion characteristics, these two counts $N_0^{ADC}$ and $N_{VREF}^{ADC}$ for each ADC will uniquely determine its input/output relationship and can therefore be used to calibrate measurements obtained from them. In particular, the relationship between the output count $N_X^{ADC}$ and the input voltage $N_X^{ADC}$ can be expressed as follows:

$$N_X^{ADC} = \left(\frac{N_{VREF}^{ADC} - N_0^{ADC}}{V_{REF}}\right) V_X^{ADC} + N_0^{ADC}$$

$$= g^{ADC} \cdot V_X^{ADC} + N_0^{ADC}$$

It will be appreciated by those skilled in the art that the scale factor of the conversion equation that represents the correspondence between the analogue input and the digital output of the ADCs 26 and 27, is commonly referred to as its 'gain' ($g^{ADC}$).

Thus the two counts $N_0^{ADC}$ and $N_{VREF}^{ADC}$ obtained for each ADC can be used to correct for the DC offset (represented by $N_0^{ADC}$) and the gain of the ADCs and therefore are stored as calibration data for the ADCs. For example, to correct for the zero offset, the count $N_0^{ADC}$ could be subtracted from subsequent counts obtained from the ADC; and to correct for the gain, the thus zero-corrected count could be divided by the ADC gain $g^{ADC}$.

Once the ADCs 26 and 27 have been calibrated successfully against the voltage reference source 30, switch S3 is set to the open circuit position as the voltage reference source 30 is not required for calibration of the remaining components.

Calibration of the PGAs

To calibrate the PGAs 22 and 23, the calibration module 52 sets multiplexers 24 and 25 to route the output from the DAC 34 to the PGAs 22 and 23. The calibration module 52 then controls the signal generator module 56 to provide a time-varying count $C_{VAR}(t)$ to the DAC 34 that will result in the DAC 34 outputting a sine wave signal $V_{VAR}(t)$ of amplitude $V_{VAR}$ of, for example, approximately 1 volt peak amplitude.

The PGAs 22 and 23 are calibrated in turn, with the L and R measurement channels being used to allow simultaneous measurement of the input and output signals of the PGA being calibrated.

During the calibration of PGA 22, the generated sine wave signal from the DAC 34 is routed via multiplexer 24 to PGA 22 and also via multiplexer 29 to ADC 27. The PGA 22 amplifies the received sine wave signal according to its present gain setting (Ai), as set by the calibration module 52, and the amplified sine wave signal is passed, via multiplexer 28 to ADC 26 where the amplified sine wave signal is digitised and passed to the calibration module 52. Similarly, the sine wave signal from the DAC 34 is digitised by the ADC 27 and this second digitised signal is passed to the calibration module 52.

The calibration module 52 then uses the ADC calibration data to apply a calibration correction to each of the first and second signals, i.e. for each signal, the appropriate ADC offset $N_0^{ADC}$ is subtracted and the result is divided by the appropriate ADC gain $g^{ADC}$.

The calibration module 52 then performs a correlation analysis of these first and second digitised signals to determine an accurate measure of the gain $g^{PGA\_Ai}$ of the PGA 22. This process is then repeated for the other gain settings of the PGA 22 in turn, so that a series of gains $\{g^{PGA\_A3}, g^{PGA\_A4}, g^{PGA\_A5}, g^{PGA\_A6}\}$ is determined for PGA 22 and stored by the calibration module 52 as calibration data.

As those skilled in the art will realise, as these gains are determined by correlating the amplified DAC signal with the DAC signal itself, it is not necessary to know exactly what amplitude the DAC signal has. Therefore it is not essential, in this embodiment, to calibrate the DAC 34 as well.

A similar process is then performed for the calibration of PGA 23, wherein the generated sine wave signal from the DAC 34 is routed via multiplexer 25 to PGA 23 and also via multiplexer 28 to ADC 26 and a corresponding series of calibrated gains $\{g^{PGA\_A7}, g^{PGA\_A8}, g^{PGA\_A9}, g^{PGA\_A10}\}$ is obtained for PGA 23 and stored by the calibration module 52 as calibration data.

Calibration of the Front-End Amplifier

The front-end amplifier 20 is calibrated in a similar way to the PGAs, i.e. with the L and R measurement channels used to allow simultaneous measurement of the input and output sine wave signals of the front-end amplifier 20 as it is being calibrated.

During the calibration of front-end amplifier 20, the generated sine wave signal from the DAC 34 is routed via switch S1 to the front-end amplifier 20 and also via multiplexer 29 to ADC 27. The front-end amplifier 20 amplifies the signal which is then passed to PGA 22 via the multiplexer 24. As the sine wave signals used in calibration are of the order of 1 volt, they are much larger than the signals that will be received from the electrodes 6 during normal flow measurement, which will be of the order of microvolts, the PGA 22 is therefore set to its lowest gain setting (1).

The amplified signal output from the PGA 22 is then passed to the ADC 26 via multiplexer 28, where it is digitised and passed to the calibration module 52. Similarly, the ADC 27 digitises the sine wave reference signal output by the DAC 34 and the calibration module 52 performs a correlation analysis, as before, to determine the gain ($g^{FEA\_A1}$) of the front-end amplifier 20

Calibration of the Current Sense Amplifier

The current sense amplifier 21 is then calibrated in a similar manner, routing the sine wave reference signal output from the DAC 34 to the current sense amplifier 21 and to the ADC 26. During this calibration, the PGA 23 is also set to its lowest gain setting for similar reasons as for the calibration of front-end amplifier 20. The determined gain ($g^{CSA\_A2}$) for the current sense 21 is then stored by the calibration module 52 as calibration data.

The above steps describe a full calibration of the flowmeter. As those skilled in the art will appreciate, once a full calibration has been performed, thereby fully populating the calibration data history store 48 and in turn the current calibration data store 51 with current calibration data, subsequent calibrations can be performed in any order.

Measurement Module

Referring generally to FIG. 4, when the scheduler 58 places the flowmeter into the measurement mode, control of the flowmeter is passed to the flow measurement module 46.

Referring to FIG. 2, flow measurement module 46 sets switch S1 to connect the electrodes 6 to the front end amplifier 20 and sets switch S2 to connect the current sensor 7 to the current sense amplifier 21 of the amplification circuitry 10. Flow measurement module 46 also sets the gains of the PGAs 22 and 23 and sets the multiplexers 28 and 29 (also shown in FIG. 2) to connect the output of the PGAs 22 and 23 to the ADCs 26 and 27.

The flow measurement module 46 then controls the signal generator module 56 to output a time-varying nominal count to the DAC 34 that will result in the DAC 34 outputting a shaped pulse excitation signal $V_{EX}(t)$. This generated excitation signal is passed to the excitation circuitry 8 where it is amplified to generate a pulsed DC drive signal which is used to drive the excitation coils 4. As a result of this excitation, sensor signals will be obtained from the electrodes 6 and the current sensor 7 and these are amplified and digitised by the amplification circuitry 10 and the ADCs 26 and 27.

The flow measurement module 46 then processes the digitised signals from the ADCs 26 and 27 and calculates the desired flow measurements from them and using the current calibration data stored in the current calibration data store 51. As those skilled in the art will appreciate, the current calibration data stored in the current calibration data store 51 is used to calibrate the signals from each channel prior to or during the flow measurement calculations.

Typically, the flow measurement calculations involve the correlation of each sensor signal with the AC excitation signal output from the DAC 34 or its numerical equivalent generated by the signal generator module 56, to determine the amplitude of the sensed signals which are then combined to determine the flow measurements. Because the flow measurement calculations are based on a correlation analysis of AC signals, the DC offsets of the ADCs can be ignored as these do not affect the calculations.

Therefore, the signals from the electrodes 6 and the current sensor 7 are calibrated by applying the appropriate gains to each one. In particular, for the electrode signal, the digitised count from the ADC 26 is divided by the stored ADC gain ($g^{ADC}$), the PGA gain ($g^{PGA\_Ai}$) and the front-end amplifier gain ($g^{FEA\_A1}$) to provide a measure of the voltage at the input of the front-end amplifier 20; and for the current sensor signal, the digitised count from the ADC 27 is divided by the stored ADC gain ($g^{ADC}$), the PGA gain ($g^{PGA\_Ai}$) and the current sense amplifier gain ($g^{CSA\_A2}$) to provide a measure of the voltage at the input of the current sense amplifier 21. The current sense signal is also divided by a calibrated measure of the actual current sensor resistance, to provide a measure of the actual current applied to the excitation coils 4. In this embodiment, the resistance of the current sensor 7 is not calibrated during the self-calibration procedure; instead, it is determined during manufacture, and is preferably selected to have a low temperature coefficient $t_c$, such that its resistance is largely independent of temperature.

The flow measurement results may be logged and/or sent via the I/O unit 60 to a standard display unit (not shown) or a remote monitoring station.

Diagnostics

As those skilled in the art will appreciate, DC offset calibration data was calculated for the ADCs during calibration but not used during flow measurements because of the correlation analysis that was used. However, in this embodiment this offset data is used when calculating various diagnostic measures, such as a measure of the absolute voltage at the electrodes 6. This measure is obtained by subtracting the DC offset for ADC 26 from the digitised count and then by dividing by the gains of the ADC 26, PGA 22 and the front-end amplifier 20. The flowmeter keeps a record of such diagnostic measures and from them can detect and report faults where appropriate.

Scheduler

As described above, the scheduler 58 transfers control of the flowmeter 1 between the calibration module 52 and the flow measurement module 46 in accordance with a stored schedule or in response to user input received via the I/O unit 60 or in response to a specific request by the calibration module 52. The scheduler 58 can, for example, be configured to alternate measurement and calibration steps such that one or more components are calibrated between successive flow measurements or can provide more control to the calibration module 52 in the event it identifies a component which may be failing.

The stored schedule comprises a series of timeframes or time slots, sized according to the size and speed of the sensor. Typical sizes of timeframe are 170 ms, 260 ms, 360 ms or longer. In this embodiment, a flow measurement uses an entire timeframe; calibration and diagnostics may use only part of a timeframe. A typical duty cycle involves one calibration or diagnostic timeframe for every five measurement timeframes. During a diagnostic timeframe, a largely predetermined sequence of operations is followed, the frequency of self-calibration and diagnostic functions being weighted according to their importance and likely rate of change. Thus, a particular calibration may be performed once every thirty seconds, whereas a particular diagnostic function—for example, determining the inter-electrode impedance, a sudden rise in which may indicate the absence of fluid in the flow conduit which may require the triggering of an alarm—may be performed every two seconds.

Advantages

Despite being constructed from mainly low cost components, a flowmeter utilising the calibration method of the present invention will be highly accurate. Typical calibration accuracy is of the order of tens of parts-per-million (ppm) i.e. of the order of 0.001%. By comparison, the signal processing components used are typically rated 0.1%-0.3% accuracy.

A further advantage is that a flowmeter using this calibration method can be recalibrated in situ. This is especially advantageous in those instances where the flowmeter has necessarily been installed in an inaccessible or dangerous location, where removal of the flowmeter for recalibration is impractical.

A particular advantage of the calibration method used in the above embodiment is that it requires only one high-quality, temperature-stable reference source ($V_{REF}$) to be used for the calibration, with the other calibrations being performed relative to the first calibration. This allows inexpensive signal processing components to be used. In particular, a flowmeter using this calibration method can use inexpensive digital signal processors (DSPs) or codecs such as those primarily designed for consumer audio products. This is unlike in the previous flowmeters which tend to use more expensive, high-performance components without self-calibration.

In order to ensure reliable measurements, calibration of the flowmeter needs to be performed regularly. In prior art flowmeters this is troublesome where there is a requirement for the flowmeter to run continuously, as when performing in a monitoring role. A full calibration may take significant time to complete (and would interfere with the measurement process); such a prolonged interruption to monitoring may be unacceptable, with the result that full calibration is performed only rarely, or else require periods of scheduled system downtime. There is therefore increased likelihood that the calibration quality of the flowmeter will deteriorate. The method of the present invention therefore provides for the calibration procedure to be integrated seamlessly with the measurement procedure. Calibration steps (or parts thereof are performed intermittently during the measurement process, thereby allowing the measurement process to proceed without major interruption and for the system to remain accurately calibrated substantially continuously.

Modifications and Alternatives

The flowmeter described above is purely exemplary; a design based on any suitable known arrangement may be employed. The calibration procedure described above can be used in any flowmeter.

In step 1 of the calibration procedure, the ADCs 26 and 27 are calibrated only against two points of the voltage reference source 30 output, namely zero and $V_{REF}$ volts. This assumes that the ADCs 26 and 27 have a linear signal response characteristic across the range 0 to $V_{REF}$. In an alternative, this assumption is not made and the ADCs 26 and 27 are calibrated against a series of outputs from the voltage reference source 30, for example the set $\{\text{zero}, V1, V2, V3 \ldots V_{REF}\}$. These calibration values may be spaced at equal intervals across the output range of the voltage reference source 30, or concentrated at a particular sub-range of interest—say in a region of known non-linearity or where high precision measurements are required.

In calibration steps 3 and 4 of the embodiment described above, DAC 34 is used to provide a sine wave reference signal which is routed through certain gain paths of the amplification circuitry 10 in turn and used to the determine the gains of the PGAs 22 and 23 and the front-end amplifiers 20 and 21. In alternative embodiments, other shapes of waveform, such as a triangular waveform, may be used. However, the advantage of using the sine waveform is that as it comprises a single frequency and so avoids the complications that may result from the components having frequency-dependent gains.

In the embodiment described above, a current sensor 7 was provided for sensing the current applied to the excitation coils 4. In an alternative embodiment, a digital representation of the excitation signal is used for flow measurement calculations, thereby only one measurement channel is used and no current sensor 7 is required. However, use of a current sensor is preferable as the current flowing through the excitation coils 4 will be affected by changes in their impedance. For example, the copper excitation coils used in the embodiment described above exhibit a change in impedance of approximately 0.2%/° K.

In the embodiment described above, two excitation coils 4 were used; alternative embodiments may use more than two coils or only one coil.

Similarly, in the embodiment described above two electrodes 6 were used; alternative embodiments may use more than two electrodes or only one electrode, measuring its potential relative to system ground.

In the embodiment described above, the DAC 34 was not individually calibrated. Although calibration of the DAC 34 has no effect on the calibration accuracy of the flowmeter, it may be considered desirable in some embodiments. For example, it may be desirable to know, with some accuracy, the amplitude of the reference signals which are injected through the various signal paths within the amplification circuitry 10 and within parts of the calculation and control circuitry 12 and this can be determined provided the DAC 34 has been calibrated. To calibrate the DAC 34, either ADC 26 or 27 can be used, or alternatively both can be used and an average taken. The calibration may then proceed as follows. Calibration module 52 sets one or both of the multiplexers 28 and 29 to route the output from the DAC 34 to one or both of the ADCs 26 and 27. Once the multiplexers 28 and 29 have been set, the calibration module 52 controls the signal generator module 56 to output a zero count to the DAC 34. In response to receiving this zero count the DAC 34 will output an analogue signal, corresponding to its DC offset $V_0^{DAC}$, which is routed via multiplexers 28 and 29 to the ADCs 26 and/or 27. In response to receiving this analogue signal the ADCs generate counts $N_0^{DAC}$ which are passed to the calibration module 52. The calibration module 52 then controls the signal generator module 56 to output a nominal count $C_{NOM}$ to the DAC 34. In response to receiving this nominal count $C_{NOM}$ the DAC 34 generates a DC signal having a nominal amplitude $V_{NOM}$ of, for example, 1 volt. As before, the generated analogue signal from the DAC 34 is routed via multiplexers 28 and 29 to the ADCs 26 and/or 27. In response to receiving this analogue signal the ADCs 26 and 27 generate counts $N_{NOM}^{DAC}$ which are passed to the calibration module 52. As those skilled in the art will appreciate, the counts obtained in this step are composite values that will include the combined zero offset and combined gain for both the DAC 34 and the corresponding ADC 26 or 27 and therefore, the zero offset $V_0^{DAC}$ of the DAC 34 can be obtained from:

$$V_0^{DAC} = \frac{(N_0^{DAC} - N_0^{ADC})}{g^{ADC}}$$

and the gain $g^{DAC}$ of the DAC 34 can be obtained from:

$$g^{DAC} = \left(\frac{N_{NOM}^{DAC} - N_0^{DAC}}{g^{ADC} C_{NOM}}\right)$$

The calibration module 52 stores these calculated values $V_0^{DAC}$ and $g^{DAC}$ as calibration data for the DAC 34 which can then be used to determine the appropriate DAC input count to generate a desired output signal level.

In the above embodiment, during the calibration mode, the gains of particular components were determined by correlating the input and output signals of each component. In an alternative embodiment, the gains could be determined by simply dividing the output signals by the corresponding input signals.

The present application also includes the following numbered clauses:

30. Processing circuitry for use in an electromagnetic flowmeter, the processing circuitry comprising:
   means for receiving signals obtained from electrodes of the flowmeter;
   a calibration data store for storing calibration data for the flowmeter; and
   means for determining flow measurement values indicative of fluid flow through the flowmeter using the signals received from the electrodes and the calibration data from the calibration data store;
   wherein said processing circuitry further comprises means for dynamically updating the calibration data to take into account changing operating characteristics of the flowmeter.

31. Processing circuitry according to clause 30, further comprising means for combining said calibration data with said signals obtained from the electrodes to correct for one or more characteristics of the components of the processing circuitry.

32. Processing circuitry according to clause 31, wherein said one or more characteristics of the components of the processing circuitry is a gain.

33. Processing circuitry according to clause 31 or 32, wherein said one or more characteristics of the components of the processing circuitry is a zero offset.

34. Processing circuitry according to any of clause 30 to 33, further comprising a calibration data history store for storing previously obtained calibration data.

35. Processing circuitry according to clause 34, further comprising means for calculating current calibration data from said previously obtained calibration data which said processing circuitry uses to determine said flow measurement values.

36. Processing circuitry according to clause 35, further comprising means for calculating current calibration data from said previously obtained calibration data using a running average calculation.

37. Processing circuitry according to any of clauses 30 to 36, further comprising means for determining and updating the calibration data for individual components of the processing circuitry.

38. Processing circuitry according to any of clauses 30 to 37, further comprising means for updating the calibration data between flow measurements.

39. Processing circuitry according to any of clauses 34 to 38, further comprising means for processing said previously obtained calibration data to identify potentially failing components.

40. Processing circuitry according to clause 39, further comprising means for identifying said potentially failing components by means of counting the total number of inconsistent calibration readings obtained for a component and detecting when said number exceeds a predetermined value.

41. Processing circuitry according to clause 39 or 40, further comprising means for identifying said potentially failing components by means of counting the number of inconsistent calibration readings obtained for a component in a given time and detecting when said number exceeds a predetermined value.

42. Processing circuitry according to any of clauses 30 to 41, further comprising means for calibrating a first component of the processing circuitry against a reference source and means for using the calibrated first component to calibrate one or more subsequent components of the processing circuitry.

43. Processing circuitry according to clause 42, wherein said reference source is a temperature stable reference source.

44. Processing circuitry according to clause 43, wherein said reference source is a temperature stable voltage reference source.

45. Processing circuitry according to clause 44, wherein said first component of the processing circuitry is an analogue-to-digital converter, ADC, and further comprising means for calibrating the ADC by applying first and second voltage levels from the voltage reference source to the input of the ADC and by using the resulting first and second digitised counts from the ADC.

46. Processing circuitry according to any of clauses 30 to 45, further comprising means for injecting AC reference signals through different gain paths of the processing circuitry to determine gain calibration data for those gain paths.

47. Processing circuitry according to clause 46, further comprising means for comparing, for the gain path into which the AC reference signal has been injected, the input signal into the gain path with the output signal from the gain path in order to determine calibration data for the gain path.

48. Processing circuitry according to clause 47, further comprising means for performing said comparison by means of a correlation analysis of the output signal with the input signal.

49. Processing circuitry according to clause 47, further comprising means for performing said comparison by means of division of the output signal by the input signal.

50. Processing circuitry according to any of clauses 46 to 49, wherein said AC reference signals have a sinusoidal waveform.

51. Processing circuitry according to any of clauses 46 to 50, further comprising means for generating said AC reference signal.

52. Processing circuitry according to clause 51, wherein said means for generating said AC reference signal of said processing circuitry comprises a digital signal generator and a digital-to-analogue converter.

53. Processing circuitry according to any of clauses 30 to 52, further comprising means for switching between a measurement mode, during which the processing circuitry performs flow measurements, and a calibration mode, during which the processing circuitry calibrates one or more of its components.

54. Processing circuitry according to clause 53, further comprising means for electrically isolating said one or more electrodes from the processing circuitry during the calibration mode.

55. A method of operating a flowmeter, the method comprising:
generating an excitation signal for application to one or more excitation coils, to generate an excitation field across a flow conduit;
sensing the electromagnetic field generated across the flow conduit as a result of interaction between the excitation field and fluid flowing along the flow conduit to generate sensor signals;
processing the sensor signals to determine one or more flow measurement values indicative of the fluid flow through the conduit;
wherein the processing step comprises determining the one or more flow measurement values using said sensor signals and stored calibration data; and
dynamically updating said calibration data.

56. A method according to clause 55, further comprising combining said calibration data with said sensor signals to correct for one or more characteristics of the components of the processing circuitry.

57. A method according to clause 56, wherein one or more characteristics of the components of the processing circuitry is a gain.

58. A method according to clause 56 or 57, wherein one or more characteristics of the components of the processing circuitry is a zero offset.

59. A method according to any of clauses 55 to 58, further comprising storing previously obtained calibration data in a calibration data history store.

60. A method according to clause 59, further comprising processing said previously obtained calibration data to calculate current calibration data which is used to determine said flow measurement values.

61. A method according to clause 60, further comprising processing said previously obtained calibration data to calculate said current calibration data using a running average calculation.

62. A method according to any of clauses 55 to 61 further comprising determining and updating the calibration data for individual components of the processing circuitry.

63. A method according to any of clauses 55 to 62 further comprising updating the calibration data between flow measurements.

64. A method according to any of clauses 59 to 63 further comprising
processing said previously obtained calibration data to identify potentially failing components.

65. A method according to clause 64 further comprising
identifying said potentially failing components by means of counting the total number of inconsistent calibration readings obtained for a component and detecting when said number exceeds a predetermined value.

66. A method according to clause 64 or 65 further comprising
identifying said potentially failing components by means of counting the number of inconsistent calibration readings obtained for a component in a given time and detecting when said number exceeds a predetermined value.

67. A method according to any of clauses 55 to 66, further comprising calibrating a first component of the processing circuitry against a reference source and using the calibrated first component to calibrate one or more subsequent components of the processing circuitry.

68. A method according to clause 67, wherein said reference source is a temperature stable reference source.

69. A method according to clause 68, wherein said reference source is a temperature stable voltage reference source.

70. A method according to clause 69, wherein said first component of the processing circuitry is an analogue-to-digital converter, ADC, and wherein the method further comprises calibrating the ADC by applying first and second voltage levels from the voltage reference source to the input of the ADC and using the resulting first and second digitised counts from the ADC.

71. A method according to any of clauses 55 to 70, further comprising injecting AC reference signals through different gain paths of the processing circuitry to determine gain calibration data for those gain paths.

72. A method according to clause 71, further comprising, for the gain path into which the AC reference signal has been injected, comparing the input signal into the gain path with the output signal from the gain path in order to determine calibration data for the gain path.

73. A method according to clause 72, wherein said comparing step includes a correlation analysis of the output signal with the input signal.

74. A method according to clause 72, wherein said comparing step includes a division of the output signal by the input signal.

75. A method according to any of clauses 71 to 74, wherein said AC reference signals have a sinusoidal waveform.

76. A method according to any of clauses 71 to 75, further comprising generating said AC reference signal.

77. A method according to clause 76, further comprising generating said AC reference signal using a digital signal generator and a digital-to-analogue converter.

78. A method according to any of clauses 71 to 77, wherein one of said gain paths includes a front-end amplifier for amplifying signals obtained from the one or more electrodes.

79. An apparatus according to any of clause 71 to 78, wherein one of said gain paths includes a current sense amplifier for amplifying signals obtained from the one or more excitation coils.

80. A method according to any of clauses 71 to 79, wherein one of said gain paths includes one or more programmable gain amplifiers for amplifying signals obtained from said one or more front-end amplifiers.

81. A method according to clause 80, further comprising adjusting the gain of said one or more programmable gain amplifiers to a lower gain during a calibration mode and to a higher gain during a measurement mode of the flowmeter.

82. A method according to any of clauses 55 to 81, further comprising switching between a measurement mode, in which flow measurements are calculated, and a calibration mode, in which the one or more circuit components are calibrated.

83. A method according to clause 82, further comprising electrically isolating one or more electrodes used to sense said sensor signals from the processing circuitry during the calibration mode.

84. A method for processing signals obtained from an electromagnetic flowmeter, the method comprising:
  receiving signals obtained from electrodes of the flowmeter; and
  determining flow measurement values indicative of fluid flow through the flowmeter using the signals received from the electrodes and stored calibration data;
  wherein said method further comprises dynamically updating the calibration data to take into account changing operating characteristics of the flowmeter.

85. A computer implementable instructions product comprising computer implementable instructions for causing a programmable computer device to perform the method of clause 84 or to become configured as the processing circuit of any of clauses 30 to 54.

The invention claimed is:
1. An electromagnetic flowmeter assembly comprising:
  one or more excitation coils for generating an excitation field across a flow conduit;
  excitation circuitry for generating an excitation signal for application to the one or more excitation coils;
  one or more electrodes for sensing the electromagnetic field generated across the flow conduit as a result of interaction between the excitation field and fluid flowing along the flow conduit;
  processing circuitry for processing signals obtained from the one or more electrodes to determine one or more flow measurement values indicative of the fluid flow through the conduit;
  wherein the processing circuitry comprises a calibration data store for storing calibration data and is operable to determine said one or more flow measurement values using said signals obtained from said one or more electrodes and said calibration data;
  wherein the processing circuitry further comprises means for dynamically updating said calibration data; and
  wherein said processing circuitry is operable to calibrate a first component of the processing circuitry against a reference source and to use the calibrated first component to calibrate one or more subsequent components of the processing circuitry.

2. An apparatus according to claim 1, wherein said processing circuitry is operable to combine said calibration data with said signals obtained from the one or more electrodes to correct for one or more characteristics of the components of the processing circuitry.

3. An apparatus according to claim 2, wherein said one or more characteristics of the components of the processing circuitry is a gain and/or a zero offset.

4. An apparatus according to claim 1, wherein said processing circuitry comprises a calibration data history store for storing previously obtained calibration data.

5. An apparatus according to claim 4, wherein said processing circuitry is operable to process said previously obtained calibration data to calculate current calibration data which said processing circuitry is operable to use to determine said flow measurement values.

6. An apparatus according to claim 5, wherein said processing circuitry is operable to process said previously obtained calibration data to calculate said current calibration data using a running average calculation.

7. An apparatus according to claim 4, wherein said processing circuitry is operable to process said previously obtained calibration data to identify potentially failing components.

8. An apparatus according to claim 7, wherein said processing circuitry is operable to identify said potentially failing components by means of counting the total number of inconsistent calibration readings obtained for a component and detecting when said number exceeds a predetermined value.

9. An apparatus according to claim 7, wherein said processing circuitry is operable to identify said potentially failing components by means of counting the number of inconsistent calibration readings obtained for a component in a given time and detecting when said number exceeds a predetermined value.

10. An apparatus according to claim 1, wherein said updating means is operable to determine and update the calibration data for individual components of the processing circuitry.

11. An apparatus according to claim 1, wherein said updating means is operable to update the calibration data between flow measurements.

12. An apparatus according to claim 1, wherein said reference source is a temperature stable reference source.

13. An apparatus according to claim 12, wherein said reference source is a temperature stable voltage reference source.

14. An apparatus according to claim 13, wherein said first component of the processing circuitry is an analogue-to-digital converter, ADC, and wherein said processing circuitry is operable to calibrate the ADC by applying first and second voltage levels from the voltage reference source to the input of the ADC and by using the resulting first and second digitised counts from the ADC.

15. An electromagnetic flowmeter assembly comprising:
one or more excitation coils for generating an excitation field across a flow conduit;
excitation circuitry for generating an excitation signal for application to the one or more excitation coils;
one or more electrodes for sensing the electromagnetic field generated across the flow conduit as a result of interaction between the excitation field and fluid flowing along the flow conduit;
processing circuitry for processing signals obtained from the one or more electrodes to determine one or more flow measurement values indicative of the fluid flow through the conduit;
wherein the processing circuitry comprises a calibration data store for storing calibration data and is operable to determine said one or more flow measurement values using said signals obtained from said one or more electrodes and said calibration data;
wherein the processing circuitry further comprises means for dynamically updating said calibration data; and
wherein said processing circuitry is operable to inject AC reference signals through different gain paths of the processing circuitry to determine gain calibration data for those gain paths.

16. An apparatus according to claim 15, wherein for the gain path into which the AC reference signal has been injected, said processing circuitry is operable to compare the input signal into the gain path with the output signal from the gain path in order to determine calibration data for the gain path.

17. An apparatus according to claim 16, wherein said processing circuitry is operable to perform said comparison by means of a correlation analysis of the output signal with the input signal or by means of division of the output signal by the input signal.

18. An apparatus according to claim 15, wherein said AC reference signals have a sinusoidal waveform.

19. An apparatus according to claim 18, comprising an AC reference signal generating means having a digital signal generator and a digital-to-analogue converter.

20. An apparatus according to claim 15, wherein one of said gain paths includes a front-end amplifier for amplifying signals obtained from the one or more electrodes.

21. An apparatus according to claim 15, wherein one of said gain paths includes a current sense amplifier for amplifying signals obtained from the one or more excitation coils.

22. An apparatus according to claim 15, wherein one of said gain paths includes one or more programmable gain amplifiers for amplifying signals obtained from said one or more front-end amplifiers.

23. An apparatus according to claim 22, wherein said processing circuitry is operable to adjust the gain of said one or more programmable gain amplifiers to a lower gain during a calibration mode and to a higher gain during a measurement mode of the flowmeter.

24. An electromagnetic flowmeter assembly comprising:
one or more excitation coils for generating an excitation field across a flow conduit;
excitation circuitry for generating an excitation signal for application to the one or more excitation coils;
one or more electrodes for sensing the electromagnetic field generated across the flow conduit as a result of interaction between the excitation field and fluid flowing along the flow conduit;
processing circuitry for processing signals obtained from the one or more electrodes to determine one or more flow measurement values indicative of the fluid flow through the conduit;
wherein the processing circuitry comprises a calibration data store for storing calibration data and is operable to determine said one or more flow measurement values using said signals obtained from said one or more electrodes and said calibration data;
wherein the processing circuitry further comprises means for dynamically updating said calibration data; and
wherein said processing circuitry is operable to be switched between a measurement mode, during which the processing circuitry performs flow measurements, and a calibration mode, during which the processing circuitry calibrates one or more of its components.

25. An apparatus according to claim 24, wherein said processing circuitry is operable to electrically isolate said one or more electrodes from the processing circuitry during the calibration mode.

26. Processing circuitry for use in an electromagnetic flowmeter, the processing circuitry comprising:
an input for receiving signals obtained from electrodes of the flowmeter;
a calibration data store for storing calibration data for the flowmeter; and
a determiner that determines flow measurement values indicative of fluid flow through the flowmeter using the signals received from the electrodes and the calibration data from the calibration data store;
wherein said processing circuitry further comprises an updater for dynamically updating the calibration data to take into account changing operating characteristics of the flowmeter; and
wherein said processing circuitry is operable to calibrate a first component of the processing circuitry against a reference source and to use the calibrated first component to calibrate one or more subsequent components of the processing circuitry.

27. A method of operating a flowmeter, the method comprising:
generating an excitation signal for application to one or more excitation coils, to generate an excitation field across a flow conduit;
sensing the electromagnetic field generated across the flow conduit as a result of interaction between the excitation field and fluid flowing along the flow conduit to generate sensor signals;
processing the sensor signals to determine one or more flow measurement values indicative of the fluid flow through the conduit;
wherein the processing step comprises determining the one or more flow measurement values using said sensor signals and stored calibration data; and
dynamically updating said calibration data; and
wherein said processing step calibrates a first component of processing circuitry used therein against a reference source and uses the calibrated first component to calibrate one or more subsequent components of the processing circuitry.

* * * * *